US006670730B2

(12) United States Patent
Bartolotti

(10) Patent No.: US 6,670,730 B2
(45) Date of Patent: Dec. 30, 2003

(54) MULTI-PHASE LINEAR MOTOR WITH INDUCTION COILS ARRANGED ON AN AXIS PERPENDICULAR TO THE DIRECTION OF MOTION

(75) Inventor: Michael Bartolotti, Bellinzona (CH)

(73) Assignee: Ballado Investments Inc., Panama (PA)

( * ) Notice: Subject to any disclaimer, the term of this patent is extended or adjusted under 35 U.S.C. 154(b) by 0 days.

(21) Appl. No.: 09/885,464

(22) Filed: Jun. 21, 2001

(65) Prior Publication Data

US 2002/0149271 A1 Oct. 17, 2002

(30) Foreign Application Priority Data

Apr. 12, 2001 (CH) ................................................ 687/01

(51) Int. Cl.[7] .............................................. H02K 41/00
(52) U.S. Cl. ....................................................... 310/12
(58) Field of Search ................................ 310/12, 13, 14, 310/20; 318/135

(56) References Cited

U.S. PATENT DOCUMENTS

| 4,607,197 A | * | 8/1986 | Conrad | ........................ 318/116 |
| 4,912,343 A | * | 3/1990 | Stuart | ............................ 310/14 |
| 5,495,131 A | * | 2/1996 | Goldie et al. | .................. 310/12 |
| 5,854,521 A |   | 12/1998 | Nolle | ........................... 310/12 |

FOREIGN PATENT DOCUMENTS

| DE | 195 04 641 A1 | 8/1996 |
| EP | 1 178 589 A1 | 2/2002 |
| WO | 02/13358 A1 | 2/2002 |

\* cited by examiner

Primary Examiner—Karl Tamai
Assistant Examiner—Judson H. Jones
(74) Attorney, Agent, or Firm—Young & Thompson

(57) ABSTRACT

A multi-phase linear motor includes a number of magnets side by side with multiple phase coils in which alternating currents that are offset by a predetermined value are made to flow. The interaction between the magnets and the phase coils causes a relative linear displacement of magnets with respect to the phase coils. In the linear motor in question, the phase coils lie on an axis that is perpendicular to the direction of motion.

4 Claims, 5 Drawing Sheets

FIG. 4 PRIOR ART
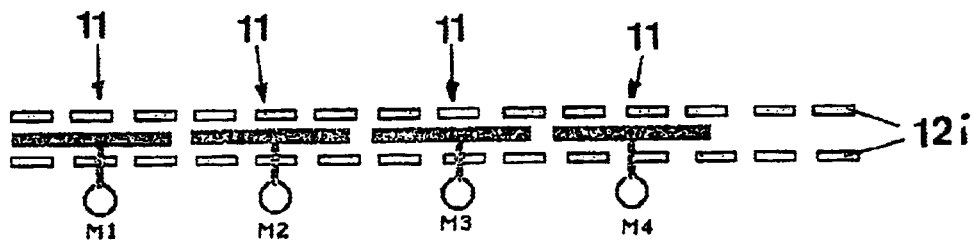
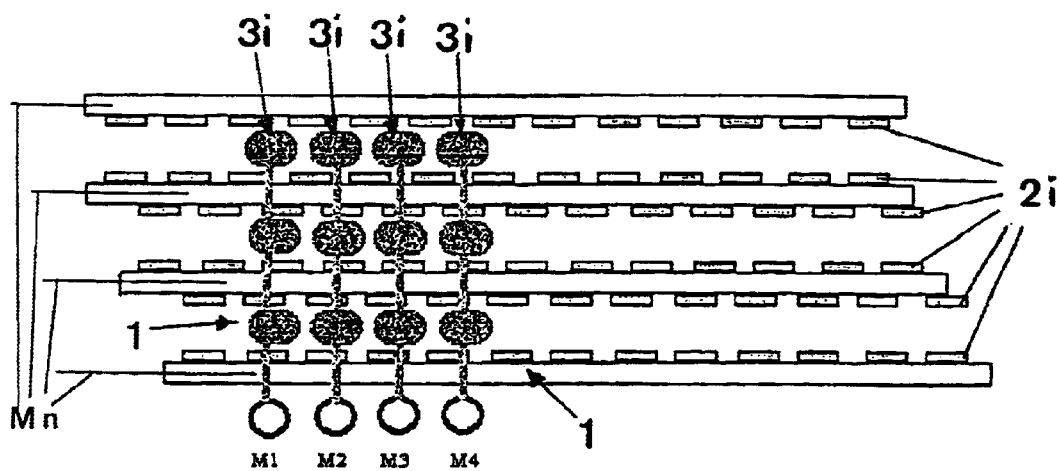
FIG. 5

US 6,670,730 B2

MULTI-PHASE LINEAR MOTOR WITH INDUCTION COILS ARRANGED ON AN AXIS PERPENDICULAR TO THE DIRECTION OF MOTION

BACKGROUND OF THE INVENTION

This invention pertains to the field of multi-phase linear electromagnetic motors. As one skilled in the art is aware, such motors are currently made up of a row of magnets if they are of the iron-core type or of two lines of magnets if they are compensated (ironless) motors. Induction coils (also called "phase coils") are arranged face to face with such magnets, in such a way as to be arranged transverse to the flux that is generated by the permanent magnets. In typical multi-phase motors, the coils that make up the phases (typically three coils, but in some cases two) are arranged longitudinally, in such a way as to be arranged in line in the direction of the motor's motion. The coils are thus arranged on an axis parallel to the motion.

The coils that make up the phases are intersected by a current that generates the actual force of the motor.

The current that passes through each of the phases has a sinusoidal plot in the direction of motion of the motor itself, in such a way that it generates a force which, again with respect to the direction of motion, is of the sine squared type.

In a two-phase motor (having two sets of phase coils), the two phases are intersected by a current that is mutually offset by 90°.

In a three-phase motor (the most common kind), the three phases are intersected by a current that is mutually offset by 120°.

For the sake of simplicity, reference will be made to the operation of the most common motor (the three-phase motor), even though all the statements are also valid for motors having more or less than three phases.

As described above, in order for the three-phase motor to operate properly, it is necessary for the three phases (whereby each phase is made up of at least one induction coil) to be made up along the direction of motion until a line of coils is formed.

Having the phases be distributed in this way means that a significant amount of room is taken up in the direction of motion of the motor itself.

This creates a significant longitudinal bulk for each individual linear motor, and this drawback creates considerable difficulties in cases where machines with multiple operating stations arranged in series are used.

The inventor of this invention has thought up a new way of arranging the component parts of a linear motor, whereby said arrangement makes it possible to avoid the above-described drawback.

SUMMARY OF THE INVENTION

The inventor has, in fact, thought up a linear electromagnetic motor in which the coils that comprise the phases of the motor are arranged on a line that is perpendicular to the rows of magnets.

In this way, as will be explained further below, a considerable amount of room is saved in the direction of motion, with less bulk for the operating units that are assisted by one or more linear motors.

BRIEF DESCRIPTION OF THE DRAWINGS

A description will now be given of some preferred embodiments of a linear motor according to the invention and, in this connection, reference will also be made to the attached drawings, where:

FIG. 4 shows the arrangements of the parts of four conventional three-phase linear motors, arranged end to end in such a way as to operate an equal number of stations of an operating unit;

FIG. 5 shows the arrangements of the parts of four three-phase linear motors according to the invention, arranged side by side in such a way as to operate an equal number of stations of an operating unit;

DETAILED DESCRIPTION OF THE PREFERRED EMBODIMENTS

Figure 1:
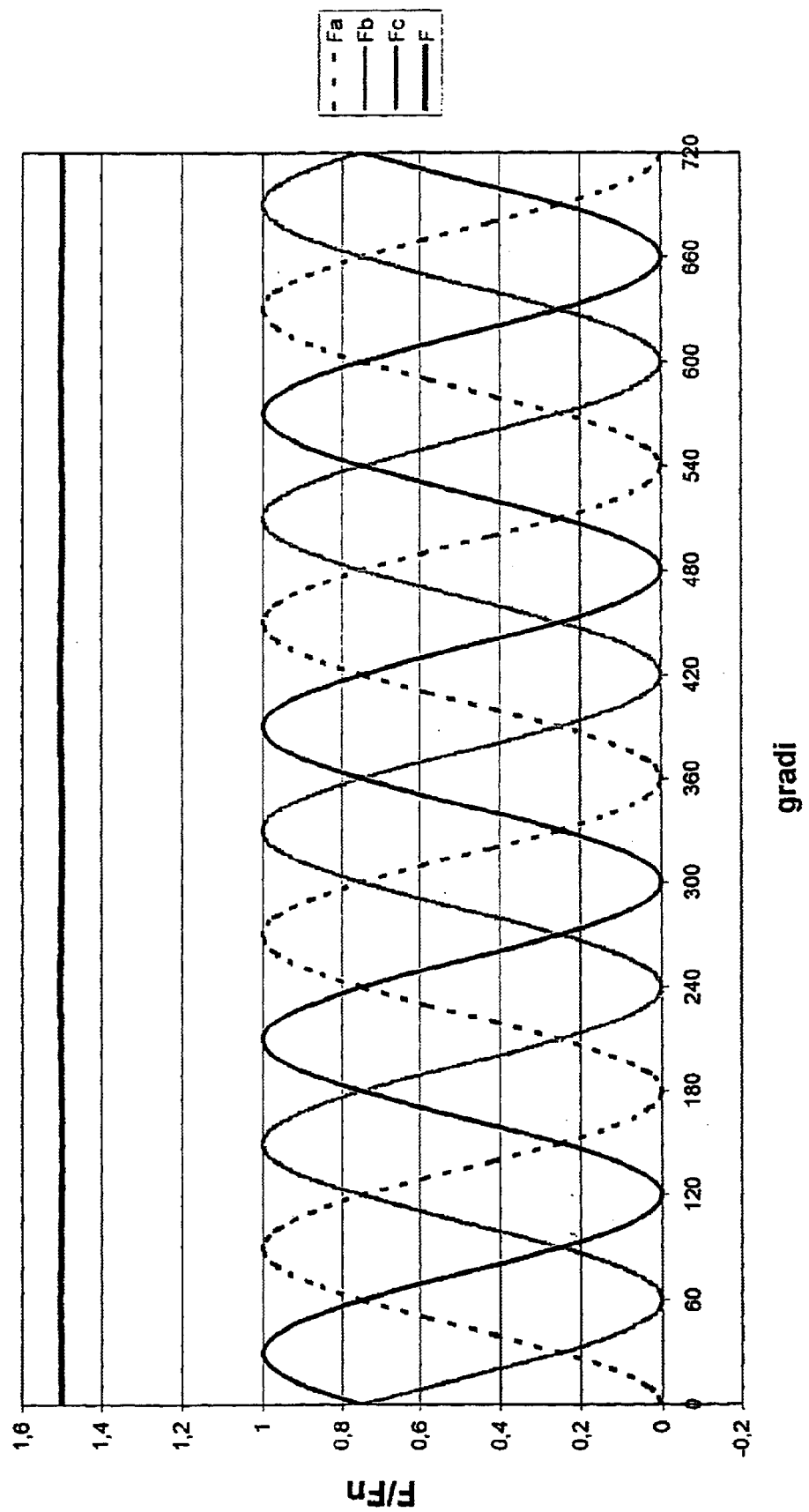
FIG. 1 shows the known plot of the electromotive forces in a three-phase linear motor.

FIG. 1 shows the plots Fa, Fb, Fc of each of the electromotive forces as longitudinal position varies, and it is clear that resultant force F remains essentially constant.

Figure 2:
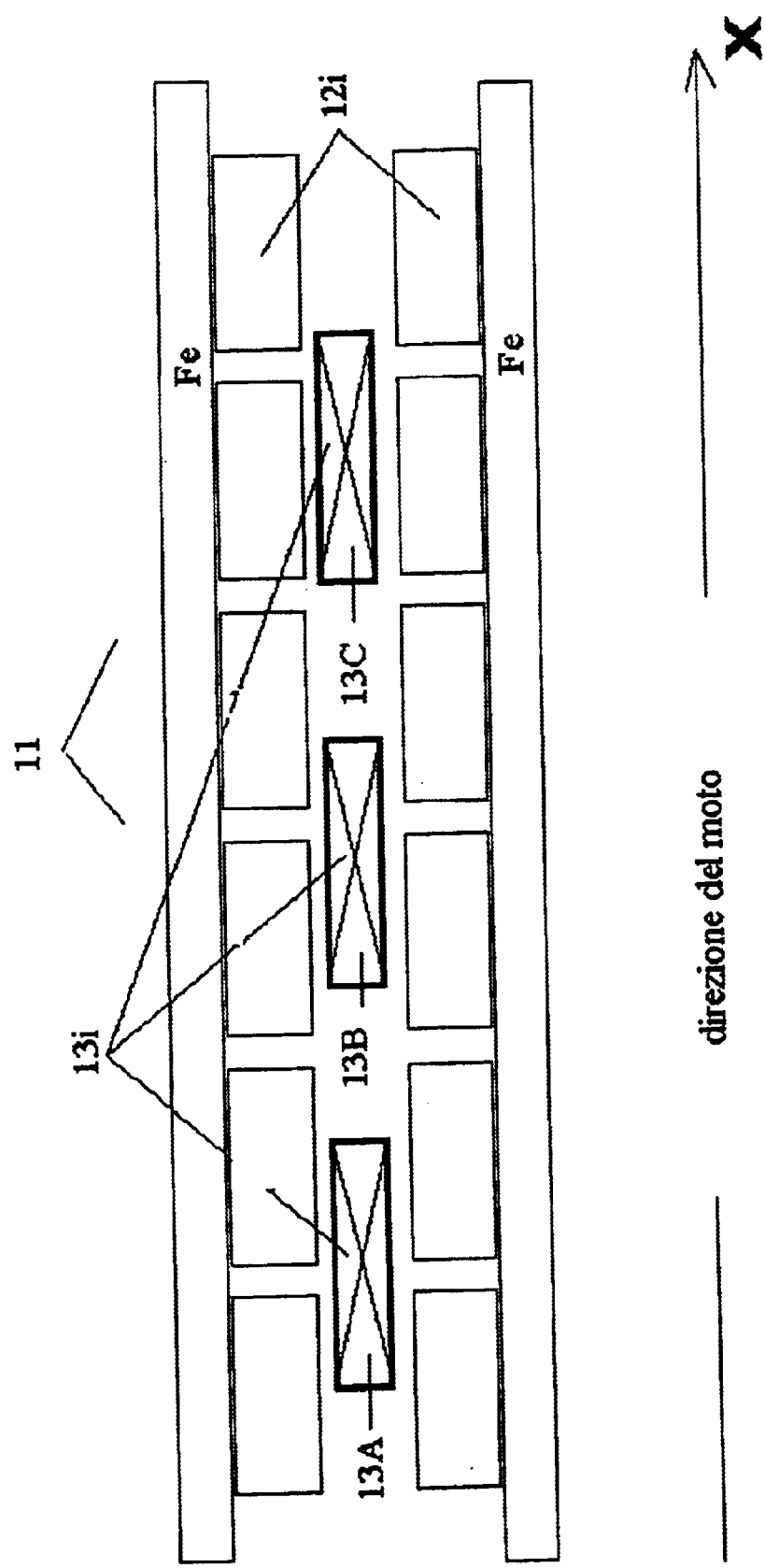
FIG. 2 shows the layout of the basic parts of a three-phase linear motor according to the state of the art.

FIG. 2 shows how magnets $12i$ and phase coils $13i$ are presently arranged in a linear motor 11 according to the state of the art in order to achieve the effect described in FIG. 1: magnets $12i$ are arranged in one or two parallel rows, and face to face with them are three coils 13A, 13B, and 13C, in each of which there flows an alternating current that is offset by 120° relative to the adjacent coils. In this way the desired effect is achieved of an essentially constant force acting on the entire set of magnets $12i$, as indicated above, but note should also be taken of the bulk along the direction of motion of motor 11; said bulk is due to the need to align three coils 13A, 13B, and 13C, which are spaced at appropriate intervals.

Figure 3:
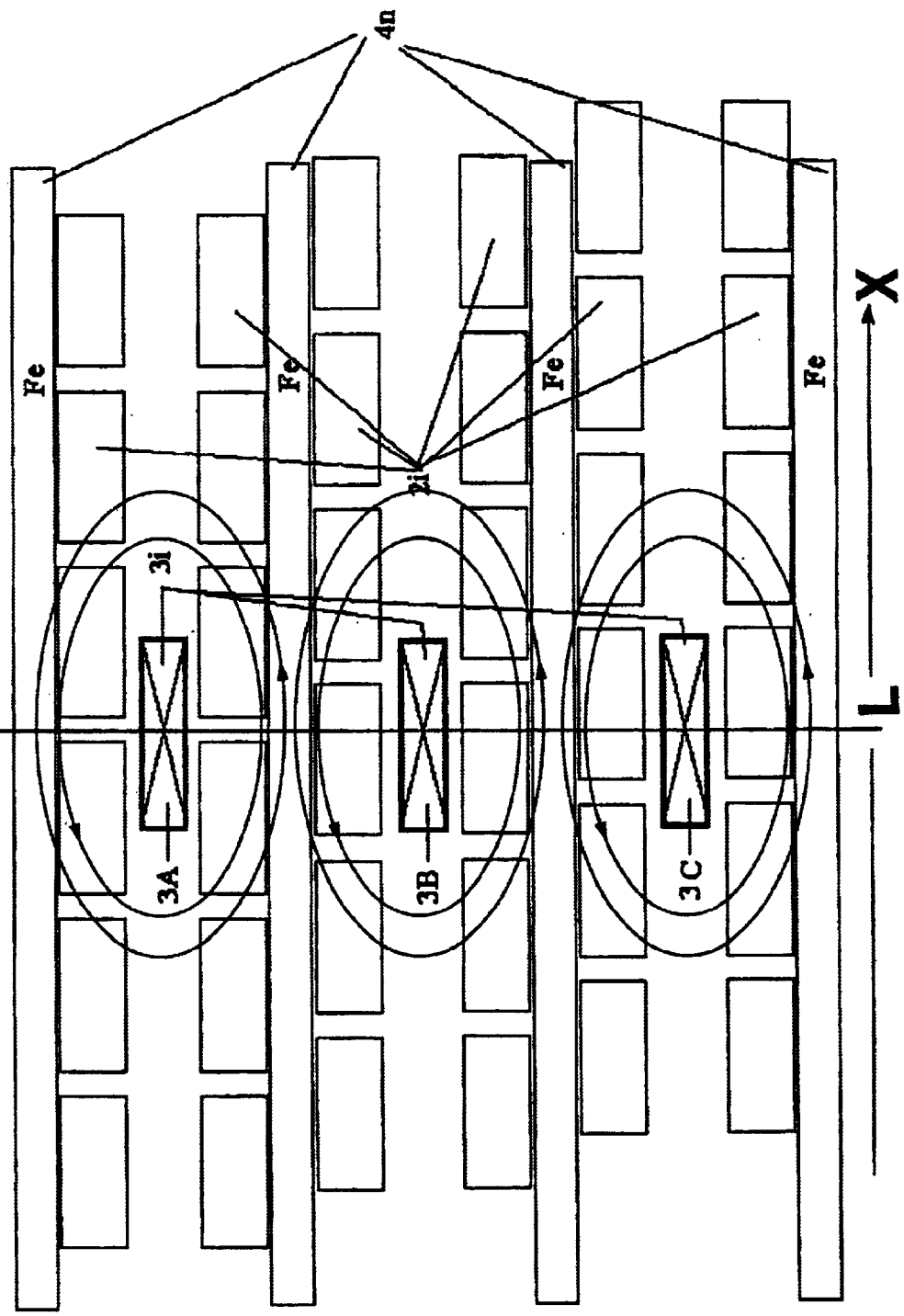
FIG. 3 shows the layout of the basic parts of a three-phase linear motor according to the invention.

FIG. 3 shows the arrangement of the parts in a three-phase linear motor 1 according to this invention; three coils $3i$, in which currents flow that are offset by 120°, are arranged along line L, which is perpendicular to the motion. If four lines Mn of magnets $2i$ are integral with the machine and if three coils $3i$ are integral with the object to be moved, the resultant of the motive forces is essentially constant, as is achieved with the above-described arrangement and is currently used, but the bulk along the direction of motion is a third as much or less because said bulk is produced by the dimensions only of one of phase coils 3A, 3B, or 3C.

The effects of the advantages that are obtained in this way are especially evident in FIG. 5.

Four series of phase coils $3i$, arranged side by side, of four linear motors 1 of the invention, which assist an equal number of stations M1, M2, M3, M4 of a single operating unit, are arranged side by side in multiple rows of magnets $2i$, whereby each row of these series is integral with each of said stations.

By controlling each linear-motor unit 1, it is possible to manage to advantage the operations of each station in such a way as to coordinate them as required. A single glance clearly shows the difference in transverse bulk for a similar operating unit having four stations M1, M2, M3, M4 that are assisted by an equal number of linear motors 11 according to the state of the art as seen in FIG. 4 (the three-phase linear motors are marked in their aggregate).

Figure 6:
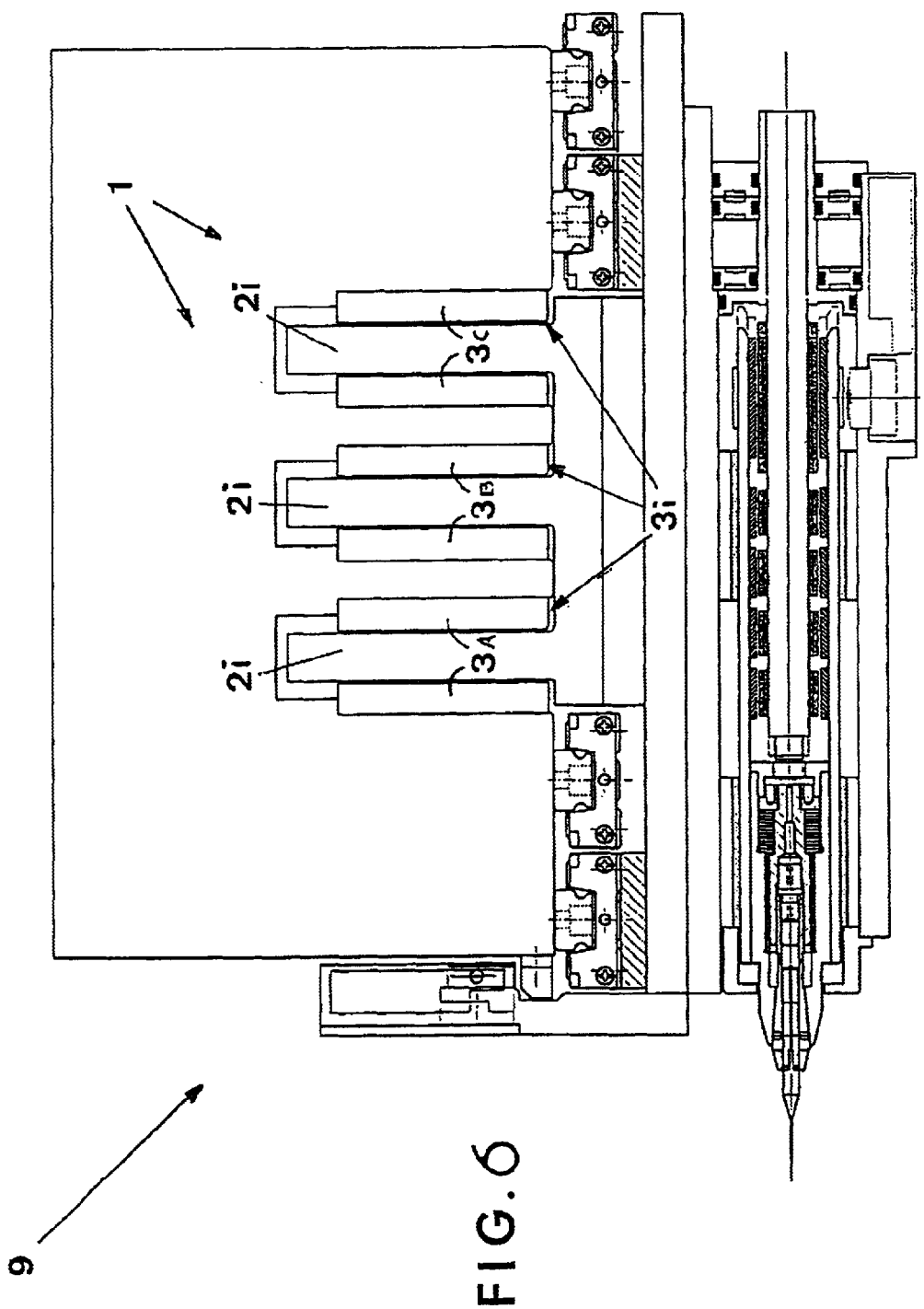
FIG. 6 shows a cross-section of an operating unit for high-speed drilling aided by a three-phase linear motor designed according to the invention.

FIG. 6, finally, shows linear motor 1 according to the invention which, for reasons of power, has three pairs of phase coils 3i and three double rows of magnets 2i, each arranged among coils 3A, 3B, 3C of each pair, attached to a drilling unit 9, for which linear motor 1 determines the desired amounts of progress in the direction perpendicular to the plane of the figure. The limited bulk of linear motor 1 of the invention is also evident in this case, which is the goal that the inventor set itself.

It is also clear, within the framework of the teachings of the attached claims, that it is possible to design different embodiments of the linear motor of the invention by attaching more parallel series of coils, varying the number of rows of magnets to which the flux of each coil is linked, using pairs of coils instead of single coils, etc.

What is claimed is:

1. Multi-phase linear motor (1) that comprises a number of magnets (2i) arranged side by side with multiple phase coils (3i) in which alternating currents that are offset by a predetermined value are made to flow, whereby the interaction between said magnets (2i) and said phase coils (3i) causes a relative linear displacement of magnets (2i) with respect to phase coils (3i), characterized by the fact that said phase coils (3i) lie on an axis (L) that is perpendicular to the direction of motion.

2. Linear motor according to claim 1, wherein said motor is of the multi-phase type and is designed in such a way that each phase coil acts on a different magnetic trace that is not the same as those of other phase coils.

3. Linear motor according to claim 1, wherein each of said phase coils do not interact with all the magnets.

4. Multi-phase linear motor that comprises a number of magnets arranged side by side with multiple phase coils in which alternating currents that are offset by a predetermined value are made to flow, whereby the interaction between said magnets and said phase coils causes a relative linear displacement of magnets with respect to phase coils, characterized by the fact that said phase coils only lie on an axis that is perpendicular to the direction of motion.

* * * * *